United States Patent [19]
Kellermann

[11] Patent Number: 5,457,711
[45] Date of Patent: Oct. 10, 1995

[54] CHANNEL SELECTOR ARRANGEMENT

[75] Inventor: Walter Kellermann, Nürnberg, Germany

[73] Assignee: U.S. Philips Corporation, New York, N.Y.

[21] Appl. No.: 103,478

[22] Filed: Aug. 6, 1993

[30] Foreign Application Priority Data

Aug. 12, 1992 [DE] Germany ............. 42 26 676.9

[51] Int. Cl.⁶ ................................ H04B 7/10
[52] U.S. Cl. ............. 375/347; 375/349; 455/133; 455/132
[58] Field of Search ................ 375/100, 102; 455/133, 134, 135, 137, 132

[56] References Cited

U.S. PATENT DOCUMENTS 4,246,655  6/1981  Parker .
4,733,301  3/1988  Wright, Jr. ............... 358/181
4,733,402  3/1988  Monsen ................... 375/100
4,984,247  1/1991  Kaufmann et al. .......... 375/1
5,268,933  12/1993  Averbuch ................. 375/100

Primary Examiner—Edward L. Coles, Sr.
Assistant Examiner—Madeleine Nguyen
Attorney, Agent, or Firm—Michael J. Balconi-Lamica; Leroy Fason

[57] ABSTRACT

A channel selector for selecting one from among a predetermined number of received signals ($e_1 \ldots e_n$), and which may be used in a mobile radio system to improve the radio traffic between a mobile and a central station. The channel selector includes a summator for summing the received signals in accordance with respective weight factors ($G_1 \ldots G_n$), and an evaluation circuit for determining the weight factors on the basis of an evaluation of a characteristic, such as channel quality or signal energy, of the received signals.

5 Claims, 1 Drawing Sheet

CHANNEL SELECTOR ARRANGEMENT

BACKGROUND OF THE INVENTION

1. Field of the Invention

The invention relates to a channel selector arrangement for selecting one received signal from a predeterminable number of received signals.

The invention further relates to a fixed radio station as well as a radio transmission system comprising such a channel selector arrangement.

Such a channel selector arrangement may be used, for example, in a radio transmission system which is formed by a plurality of receivers installed at different locations in a receiving area. Each of these receivers is provided for receiving a radio signal transmitted by a mobile station such as, for example, an aeroplane. The radio signals are received by a given number of receivers and can be transmitted to a central station. In the central station they are combined, i.e. the given number of received signals are transformed into a single output signal. For example, the "best" received signal branch is selected as the output signal.

DESCRIPTION OF THE RELATED ART

An arrangement of this type is known, for example, from U.S. Pat. No. 4,246,655. In FIG. 2 thereof a plurality of receiving signals are applied to individual receivers. The output signals of the receivers are applied to means therein for determining the signal-to-noise ratio. In addition, the output signals of all receivers are conveyed to a channel selector arrangement which selects a receiving branch. The channel selector arrangement is driven by detecting means which evaluates the output signals of the signal-to-noise ratio determining means.

SUMMARY OF THE INVENTION

It is an object of the invention to provide an arrangement of the aforesaid type in which the radio traffic between a mobile station and a central station is improved.

This object is achieved by providing a channel selector which comprises a summator for summing the input signals thereto weighted with weight factors, and an evaluation arrangement for determining the weight factors based on an evaluation of the received signals.

The received signals consist of radio signals which are transmitted as radio messages from a mobile station installed, for example, in an aeroplane. These radio messages are received by a plurality of receiver stations arranged at different locations within a receiving area and conveyed to a central station as received signals through a plurality of receiving branches. The received signals may be transmitted as analog signals to the central station and be digitized in or before the channel selector, or the received signals are may be transmitted already in digital form between the receiver stations and the central station because they were digital transmission signals or because they were digitized in each receiver station, so that in any case digital received signals are available. The received signals are conveyed through a first signal path to a summator and through a second signal path to the evaluation arrangement. The evaluation arrangement evaluates the received signals and determines therefrom the weight factors to be used in the weighted summation derived the summator. Determining the weight factors requires only a short period of, such as time about several milliseconds, so that the selection of the received signals requires only a small reaction time. This is highly favourable, for example, for radio messages in air-to-ground communication. The weight factors may be values between 0 and 1, so that no clicking sound occurs between the received signals when switching over takes place. Since only the received signals themselves need to be evaluated, signalling information, for example, in the form of signalling tones at the beginning and end of each radio message, can be omitted.

According to a first basis for the evaluation of the received signals, the evaluation arrangement comprises a signal processor for recovering signal energy from each received signal.

The influence of disturbances especially of pulse-like character on the channel selection may be reduced in that the signal processor is followed by a median filter.

A first classification of the received signals into "sampled" signal components and signal components in which only channel "noise" is audible, can be made by an evaluation arrangement which comprises a pause detecting means which evaluates the signal energy of the received signals, which pause detecting means is provided for determining a first state of "radio message" and a second state of "pause" from a short-time energy calculation and a threshold decision.

An erroneous classification of the state of "pause", for example when a speaker breathes, is avoided in that a given period of time is provided after the end of a determination of a state of "radio message", to which period of time the state of "radio message" is also assigned following the end of the detected state of "radio message".

The weight factors are, in essence, assigned because the evaluation arrangement comprises a determining means for determining the channel quality of the received signals, which determining means is used for estimating the channel quality from the signal-to-noise ratio of the received signals when the first state of "radio message" is detected.

A further implementation of the estimated channel quality of a present radio message is then ensured in that for determining the channel quality for the detected state of "radio message" the maximum value of the previous channel quality and the estimated signal-to-noise ratio is used, and for the detected second state of "pause" the product of a predeterminable factor and the previous channel quality is used.

The cutting off of initial syllables of a radio message is avoided in that the evaluation arrangement comprises a determining means for determining the weight factors, the received signal for which the state of "radio message" was first detected being given priority for the assignment of the weight factors.

BRIEF DESCRIPTION OF THE DRAWINGS

In the following the invention will be further explained with reference to the embodiments shown in the drawing Figures, in which.

DESCRIPTION OF THE PREFERRED EMBODIMENTS

Figure 1:
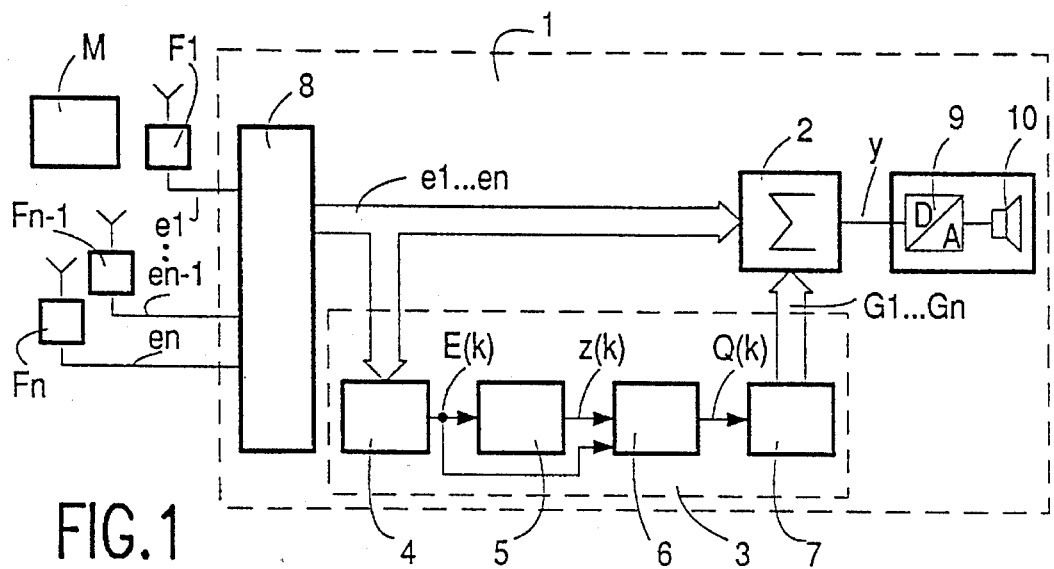
FIG. 1 shows a radio transmission system comprising a channel selector.

The radio transmission system shown in FIG. 1 comprises a channel selector 1 which is installed, for example, in a fixed radio station installed on the ground (ground base). The channel selector 1 is supplied with input signals e1 . .

. en which are received by the receiver stations F1 ... Fn. The channel selector 1 further includes an input unit 8 to which the input signals e1 ... en are optionally applied in digital form, for example, PCM format. The input signals e1 ... en are applied to a summator 2 as well as an evaluation arrangement 3. The evaluation arrangement 3 comprises a signal processor 4 for recovering a signal energy E(k), a pause detecting means 5 for determining a first state of "radio message" z(k)=F and a second state of "pause" z(k)=P, a channel quality evaluating means 6 for evaluating a channel quality Q(k) as well as a weight factor assigning means 7 for assigning weight factors G1 ... Gn. At the output of the summator 2 a received signal y is available which is formed by the weighted sum of the input signals e1 ... en, which received signal y is transported to a loudspeaker 10 via a digital/analog converter 9.

The transmission system shown in FIG. 1 is used for transmitting radio signals between a pilot located at mobile station M and an operator located at an operational exchange on the ground near the loudspeaker 10. The communication between the pilot and the operator is then to be highly reliable and free from delay. To ensure reliability of these connections, the transceiver stations F1 ... Fn are distributed over various locations throughout the transceiver coverage area.

The input signals e1 ... en are based on radio messages which are transmitted from a mobile station M, for example, installed in an aeroplane. The channel selector arrangement 1 has for its object to evaluate the received signals e1 ... en of all the receiver stations F1 ... Fn and, for example, make the best channel i.e. each best received signal e1 ... en available to an operator via a loudspeaker 10.

For this air-to-ground communication the received radio signals (=received signals) e1 ... en of all the receiver stations F1 ... Fn are transported to the channel selector 1 of the operational exchange, for example, in a channel multiplex transmission method. The radio connection between the mobile station M and the receiver stations F1 ... Fn is time-variable with the movements of the aeroplane. In addition, the radio connection between the mobile station M and the receiver stations F1 ... Fn is "scanned" i.e. there is a complete radio connection only for specific periods of time. During the period of time in which there is no radio connection, the transmission channel is, in essence, time-invariable and at the operational exchange it is only possible to detect noise. In the transmission system shown in FIG. 1 the use of signalling tones for marking a beginning or end of a radio message is omitted on purpose, because they imply additional circuitry and cost. The received signals e1 ... en are transmitted from the receiver stations F1 ... Fn in analog or digital form. If the received signals e1 ... en are transmitted in analog form from the receiver stations F1 ... Fn, they are digitized in the receiver unit 8, so that the received signals e1 ... en are available in digital form, for example, in PCM format, at the output of the input unit 8. The n received signals e1 ... en are not affected by the channel selector 1, but multiplied in the summator 2 in "channel synthesis" with the weight factors G1 ... Gn and added together. Via the loudspeaker 10 this weighted sum is then made audible as a selected received signal y, being the output signal after digital/analog conversion by the digital/analog converter. The main object of the channel selector 1 consists of determining the weight factors G1 ... Gn in response to the received signals e1 ... en. For this purpose, the evaluation arrangement 3 is used. In a first step in the signal processor 4 the signal energy E(k) is measured for each received signal e1 ... en. On the basis of the measured signal energies E(k) a classification into "radio message/pause" is made to determine the states of z(k)=F and z(k)=P in the pause detecting means 5. If the first state of "radio message" F occurs, the channel quality Q(k) is determined in the evaluating means 6 and, subsequently, the weight factors G1 ... Gn are derived therefrom for the individual received signals e1 ... en. The weight factors G1 ... Gn then vary between 0 and 1 and thus make it possible to provide a smooth transition from the off state (=0) to the "on" state (=1) and vice versa, so that there is no switching noise e.g. clicking sound at the transition between individual received signals.

Figure 2:
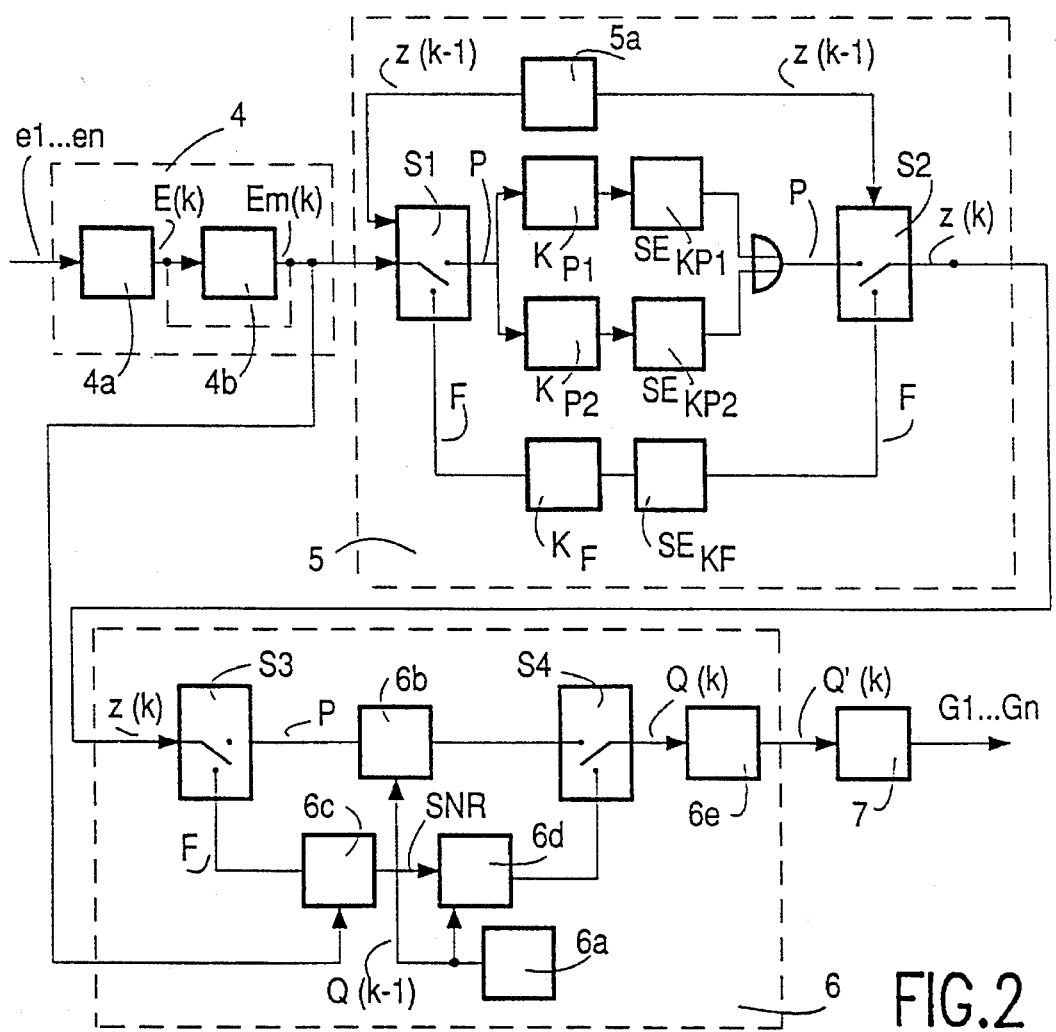
FIG. 2 shows an embodiment of an evaluation in the channel selector of FIG. 1.

FIG. 2 shows an exemplary embodiment of an evaluation 3 as can be used in the channel selector arrangement represented in FIG. 1. The reference characters already used with reference to FIG. 1 are used here too. The separate steps of the evaluation arrangement 3 are further explained with respect to FIG. 2, while the channel indexes for distinguishing the different received signals e1 ... en are omitted because the received signals e1 ... en from all the channels are processed similarly and independently of the other channels. The channel index will not be used until the weight factors G1 ... Gn have been determined.

In the signal energy evaluator 4 the signal energy E (=short-time energy value E(k)) is determined by means of the processor unit 4a in accordance with the following equation $$E(k) = \frac{1}{L} \sum_{\lambda=0}^{L-1} x(k \cdot L - \lambda)^2 \qquad (1)$$

It is assumed that each signal sample value x(i) of a specific channel is used only once for the energy measurement, so that one energy value E(k) is obtained for every L sample values and that the signal processing based thereon is accordingly to be recommenced after every L sampling intervals. In a practical embodiment 4 ms was chosen for an averaging period which corresponds to L=32 sample values for an 8 kHz sampling rate. This guarantees that the energy measurement also allows of the detection of very brief pauses within a radio message and, simultaneously, that the averaging period is not too short for rather reliable measuring values to be obtained°

The influence of pulse-like disturbances on the selection of the received signals e1 ... en may be reduced if after the signal energy E(k) has been determined, a median filtering is performed by means of a median filter 4b. For this purpose, the last N energy values are sorted out according to size at a discrete point of time k, with the median $E_m(k) = E_{(N-1)/2}$.

The pause detecting means 5 is used for determining the first state of "radio message" F, i.e. z(k)=F and the second state of "pause" P i.e. z(k)=P. The state decision of the pause detecting means 5 is then, in essence, based on a non-linear calculation of a value derived from the short-time energy E(k) or the modified short-time energy $e_m(k)$ and a subsequent threshold decision. The signal energy E(k) and $E_m(k)$ as well as the most recently adopted state z(k-1) are used as input values for the pause detecting means 5, which most recent state is delivered by a memory 5a to a first switch S1 at the input and to a second switch S2 at the output of the pause detecting means 5. It is essential that the decision whether the most recently adopted state z(k-1) is maintained or whether the other state is changed to, be made in the "pause" state in accordance with the criteria $K_{p1}$, $K_{p2}$ and in the "radio message" state according to a criterion $K_F$ i.e. in the "pause" state in accordance with a different criterion from the "radio message" state. The criterion for the signal energy $E(k)$ and $E_m(k)$ to be currently evaluated is determined in the pause detecting means in dependence on the previous state $z(k-1)$. The criterion for determining the second "pause" state can then be formed from two separate criteria $K_{p1}$, $K_{p2}$, whose decisions can be considered an OR combination if the first "radio message" state is set to 1 and the second "pause" state is set to 0.

The criteria $K_{p1}$, $K_{p2}$ always compare the current short-time energy $E(k)$ with previous energy values. With the criterion $K_{p1}$ the directly preceding short-time energy $E(k-1)$ is used for the comparison, so that the following holds for the criterion $K_{p1}(k)$:

(2)

$$K_{P1}(k) = |\Delta E(k)| = |E(k) - E(k-1)|$$

In contrast, for the criterion $K_{p2}$ the comparison with a mean value $\bar{E}$ of previous short-time energy values is made in the following manner (3)

$$K_{P2}(k) = |E(k) - \bar{E}(k-1)|$$

$$\bar{E}(k) = \alpha \cdot E(k-1) + (1-\alpha) \cdot \bar{E}(k-1),$$

where $\alpha$ is typically of the order of 0.1.

The threshold values for the subsequent threshold decisions $SE_{KP1}$, $SE_{KP2}$, $SE_{KF}$ can be determined in a particular case and adapted to the short-time energy of the channel noise. In a simulation, for example, thresholds of the order of $10^{-3}$ proved to be suitable. The underlying idea for the selection of criteria for the pause detecting means 5 consists of the fact that sudden energy changes, especially a rise of energy, are detected reliably and fast. The energy values $E(k)$ for the channel noise i.e. for the second state of "pause" is then assumed to vary relatively little. As a criterion for determining the first state of "radio message" F the mean energy variation is tested when one is in the state of "radio message" i.e. $z(k)=F$. The calculation is then made, for example, according to the following relationship:
(4)

$$K_F(k) = \beta \cdot |\Delta E(k)| - (1-\beta) \cdot K_F(k-1)$$

For the selection of the decision threshold $SE_{KF}$ it has proved to be suitable to select this threshold equal to the most recently detected short-time energy $E(k-1)$.

The quality evaluating means 6 of the evaluation arrangement 3 is used for determining a channel quality $Q(k)$ of the received signals $e1 \ldots en$. An estimate of the channel quality Q is then made in accordance with a signal-to-noise ratio SNR of each received signal $e1 \ldots en$ only with the detected first state of "radio message".

It has appeared to be advantageous to determine the channel quality $Q(k)$ with the detected first state of "radio message" F on the basis of a maximum of the previous channel quality $Q(k-1)$ and the estimated signal-to-noise ratio SNR. With the detected second state of "pause" P the channel quality $Q(k)$ is determined on the basis of the product of a predeterminable factor $\tau$ and the previous channel quality $Q(k-1)$. Thus the following equation holds for the definition of the channel quality $Q(k)$:

$$Q(k) = \begin{cases} \max\{SNR(k), Q(k-1)\} & k \in F \\ \tau \cdot Q(k-1) & k \in P \end{cases} \quad (5)$$

where the predeterminable factor $\tau$ is slightly smaller than 1.0, for example, $\tau=0.999$, and $Q(0)=0$. Consequently, within a radio message the maximum of the previous channel quality $Q(k-1)$ and the actual estimated SNR value are used. The definition for the channel quality $Q(k)$ according to equation 5 causes the influence of an estimated SNR value to decrease more the longer time it is past, and at the same time provides that in the next radio message a current value can be substituted all the faster for the estimated SNR value. With the definition of the channel quality $Q(k)$ based on equation 5 there is achieved that this quality is not to be calculated completely again for each radio message F, but that the maximum amount of information from the previous radio message is incorporated in the current estimate. This eliminates the disadvantage that the current SNR estimate at the beginning of a radio message is not yet very reliable. On the other hand, the definition of the channel quality $Q(k)$ laid down in the equation 5 also ensures that in the event of a breakdown of the channel that was estimated to be the best channel during the most recent radio message but has meanwhile failed, a radio message is lost. The definition of the channel quality $Q(k)$ laid down in equation 5 additionally provides that the first part of the transient operation, when the SNR estimate is to be determined, does not influence the channel quality $Q(k)$, but when the SNR ratio has built up sufficiently, the channel quality $Q(k)$ will follow the current SNR estimate. In the pauses the channel quality $Q(k)$ corresponds to the exponentially decreasing weighted SNR, estimate of the previous radio message.

FIG. 2 gives a schematic representation of equation 5 by way of a block diagram. At the output and at the input of the means 6 the respective switches $S_3$, $S_4$ are provided which can be switched over between the switch position P for $z(k)=P$ and position F for $z(k)=F$ in dependence on the state $z(k)$. The branch for the switch position P comprises a multiplier 6b which performs a multiplication of the previous channel quality $Q(k-1)$ by the factor $\tau$. The branch for the switch position F comprises a determining means 6c which determines the SNR estimate in response to the energy values $E(k)$ in accordance with the instruction to be given hereinafter as equation 6. The quality calculating means 6d determines the current channel quality $Q(k)$ in accordance with equation 5 for $z(k)=F$ on the basis of the SNR value and the previous channel quality $Q(k-1)$.

In the following there will be described how the SNR estimate can be determined on the basis of the signal energy E. To this end the following definition for the SNR estimate has proved advantageous:

$$SNR = \begin{cases} 0 & k \in P \\ \log \frac{\max_{i \in F, i \leq k} E(i)}{\min_{i \in F, i \leq k} E(i)} & k \in F \end{cases} \quad (6)$$

Herein $k \in F$ denotes that the estimation is made only during a radio message i.e. when the estimated state $z(k)=F$. Naturally, the criterion defined in equation 6 demands a certain transient time for finding the extreme values. In practice the first signal energy after the detection of a radio message F will be used both as a maximum and as a minimum and, based thereon, all further signal energy values will be verified whether they represent a new maximum or minimum. Only when the maximum or minimum value no longer changes or changes only slightly, can this be called a reliable measurement value.

It has been found advantageous to use a modified channel quality Q' in lieu of the channel quality Q determined on the basis of equation 5, which modified quality is the channel quality Q(k) according to equation 2 multiplied by a low-pass filtered energy value. For this reason the output of quality evaluating means 6 is preceded by a multiplier 6e. This multiplier 6e solves two problems at once, firstly, a soft auditory impression which is the result of different input levels of the various received signals e1 . . . en is avoided, and secondly, the cutting off of initial syllables of a radio message is eliminated. Altogether, there is a first come first serve strategy i.e. the channel scanned first receives the highest priority when the weight factors are assigned, as long as no other channel having a better quality has been detected.

Based on the results of the energy detector 4, the pause detecting means 5, and the quality evaluating means 6, the weight factors G1 . . . Gn are determined in the weight factor assigning means 7. When the weight factors are determined for the individual received signals e1 . . . en, the following is to be considered: As long as no radio message has been received, all channels are assigned the same weight G1 . . . Gn=1/N, where N is the number of receiving channels. Once different quality values for different channels have been determined, the weight of the best channel is increased according to:

$$G_{vmax}(k) = \min\{,\max\{\eta \cdot G_{vmax}(k-1), \epsilon_S\}\} \quad (7)$$

where $\eta$ is a constant which determines the rate of the exponential increase. $\epsilon_S$ is a near-0 initial value which has an effect if the previous weight factor was about zero or equal to zero. In contrast, the weight of the channel whose quality Q(k) or Q'(k) is the smallest, is reduced as follows:

$$G_{vmin}(k) = \max\{,G_{vmin}(k-1)/\eta - \epsilon_S\}. \quad (8)$$

Herein $\eta$ determines the time constant of the approximately exponential decrease and $\epsilon_S$ provides that the weight 0 is reached in a finite short period of time. Because the weight factors G1 . . . Gn are determined in this fashion, the following requirements are largely satisfied:

If one or a plurality of radio paths are scanned, at least one channel should be audible, so that no message is lost. In addition, only one channel should be audible to avoid reverberation effects which are caused by relative delays of the various channels. The transition between the channels should not be accompanied by switching noises, for example, clicking sounds etc., but should nevertheless be performed as fast as possible. Furthermore, all the channels should have the same treatment as long as there is no information on the quality available for any of the channels.

The first requirement is then satisfied already by the definition of Q'(k), the restriction to one audible channel is satisfied by sorting out the signals as this is done by the decrease of the weight factors of the poorest channel. Smooth transitions are obtained by an approximately exponential increase and decrease of the weight factors G1 . . . Gn.

Once the weight factors G1 . . . Gn have been determined, there is first a weighted summation of the individual received signals e1 . . . en with the weight factors G1 . . . Gn in the summator 2 in accordance with the relationship shown in equation 9:

$$y(k \cdot L + i) = \sum_{v=0}^{N-1} G_V(k) \cdot x_V(k \cdot L + i). \quad (9)$$

I claim:

1. A channel selector for use in a communication system which includes a plurality of transceiver stations which are assigned to respective communication channels for transmission of information signals therein, the channel selector being coupled to the transceiver stations for selecting from which of said channels and in what relative proportions to utilize the information signals in the respective channels; said channel selector comprising:

receiving means for receiving the respective channel signals;

summation means for deriving a summation of the channel signals weighted in accordance with weight factors respectively applicable thereto; and evaluation means coupled to said receiving means for carrying out quality evaluations of the channel signals and deriving from said quality evaluations the weight factors respectively applicable to respective channel signals;

characterized in that said evaluation means comprises a signal processor for determining an energy value (E) of each channel signal;

a pause detector coupled to the signal processor for receiving the channel signal energy values and based on a threshold decision relating thereto determining a classification of each channel as being in either a message state (F) or a pause state (P);

a channel quality evaluator coupled to said pause detector for determining, in successive evaluation periods, a channel quality (Q) of each channel, said determination for a channel which is in the message state being based on a maximum channel quality ($Q_{k-1}$) thereof during a previous evaluation period and a signal-to-noise ratio of the channel signal, said determination for a channel which is in the pause state being based on the product of a predetermined factor and a channel quality ($Q_{k-1}$) of said channel during a previous evaluation period; and processing means coupled to the channel quality evaluator for determining the weight factors for the channel signals from the applicable channel quality values, the channel for which the message state was first detected being given priority in assignment of weight factors to the various channels.

2. A fixed radio station for use in a mobile radio system, comprising a channel selector as claimed in claim 1.

3. A radio transmission system comprising a channel selector as claimed in claim 1.

4. A channel selector as claimed in claim 1, wherein said signal processor comprises a median filter.

5. A channel selector as claimed in claim 1, wherein at the end of a determined message state of a channel a predetermined time period is provided by said pause detector during which the channel continues to be treated as being in the message state notwithstanding the absence of a received signal therein.

* * * * *